United States Patent
Kawahito et al.

(10) Patent No.: US 7,240,337 B2
(45) Date of Patent: Jul. 3, 2007

(54) EXECUTING SCALAR REPLACEMENT IN PROGRAM OPTIMIZATION

(75) Inventors: Motohiro Kawahito, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 10/342,421

(22) Filed: Jan. 14, 2003

(65) Prior Publication Data
US 2003/0140336 A1    Jul. 24, 2003

(30) Foreign Application Priority Data
Jan. 17, 2002    (JP) .............................. 2002-008904

(51) Int. Cl.
*G06F 9/45* (2006.01)
(52) U.S. Cl. ...................... 717/136; 717/151; 717/154; 717/155
(58) Field of Classification Search ........ 717/136–140, 717/154–156, 162–165, 131, 133, 138, 158–159; 707/103, 206
See application file for complete search history.

(56) References Cited

U.S. PATENT DOCUMENTS

| | | | |
|---|---|---|---|
| 5,710,927 A * | 1/1998 | Robison ................. | 717/155 |
| 6,075,942 A * | 6/2000 | Cartwright, Jr. ......... | 717/138 |
| 6,665,865 B1 * | 12/2003 | Ruf ........................ | 717/157 |
| 6,681,385 B1 * | 1/2004 | Steensgaard et al. ..... | 717/133 |
| 6,769,004 B2 * | 7/2004 | Barrett .................... | 707/206 |
| 2002/0092005 A1 * | 7/2002 | Scales ..................... | 717/162 |
| 2002/0095667 A1 * | 7/2002 | Archambault ............ | 717/154 |

FOREIGN PATENT DOCUMENTS

WO    WO91/20029    12/1991

OTHER PUBLICATIONS

John Whaley, "Partial method compilation using dynamic profile information" Oct. 2001, ACM Press, vol. 36, Issue 11, pp. 166-179.*

Kazuaki Ishizaki et al. "A Study of Devirtualization Techniques for a Java Just-In-Time Compiler" Oct. 2000, ACM Press, vol. 35, Issue 10, pp. 294-310.*

"A Method for Estimating Optimal Times of Unrolling for Nested Loops", IPSJ Journal, vol. 37 No. 6 p. 1138-1148.

"A Loop Unrolling Technique In An Instruction Parallelism Compiler" IEICE Technical Report vol. 92 No. 108 p. 23-30.

(Continued)

*Primary Examiner*—Wei Zhen
*Assistant Examiner*—Anna Deng
(74) *Attorney, Agent, or Firm*—Louis P. Herzberg (57) ABSTRACT

The present invention enables one to execute scalar replacement in program optimization, more effectively without executing analysis in a method. The present invention is provided with a code conversion unit 110 for generating a machine language code based on a source code of an execution program to be processed, an optimized range determination unit 120 for, for a method in the execution program of the machine language code, finding a range in which an object created in the method does not escape, and a scalar replacement execution unit 130 for executing the scalar replacement in the range in which the object does not escape.

22 Claims, 7 Drawing Sheets

OTHER PUBLICATIONS

"Escape Analysis for JAVA" Proceedings of the Conference on OOPSLA, Nov. 1999 p. 1-19.

Compositional Pointer and Escape Analysis for Java Programs; John Whaley and Martin Rinard; Laboratory for Computer science; Massachusetts Institute of Technology, Cambridge, MA 02139(OOPSLA '99).

Escape Analysis for Java; Jong-Deok Choi, Manish Gupta, Mauricio Serrano, Vugranam C. Screedhar and Sam Midkiff; IBM T.J. Watson Research Center ,Box 218, Yorktown Heights, NY 10598 (OOPSLA '99).

* cited by examiner

```
for (each A ∈ a set of memory accesses to be optimized) {
    if (object of A ∈ a set, which is found in a location of this command, of the objects which are created by new,
    newarray or the like in the method and have not escaped yet) {
        < the value of A may never be changed in this method invocation, therefore the optimization may be
        executed beyond this method invocation >
    } else {
        < the value of A may be changed in this method invocation, therefore the optimization may not be
        executed beyond this method invocation >
    }
}
```

Fig. 5

```
Obj = NEW xx;        /* Create an object of a class xx and assign it into a variable Obj */
Obj.x = a;           /* Assign the value of a variable a into a field x in Obj (the value on the memory) */
foo (D, E)           /* Invoke a method foo.   Arguments are D and E */
b = Obj.x;           /* Assign the value of a variable b from the field x in Obj (the value on the memory) */
D.obj = Obj;         /* Assign the variable Obj into a field obj in D (the value on the memory) */
foo (D, E)           /* Invoke a method foo.   Arguments are D and E */
c = Obj.x;           /* Assign the value of the field x in Obj (the value on the memory) into a variable c */
```

Fig. 6

```
Obj = NEW xx;               The set of objects which
Obj.x = a;                  have not escaped
foo (D, E)                  ( Obj )
b = Obj.x;                  ( Obj )
D.obj = Obj;                ( Obj )

foo (D, E)
c = Obj.x;
```

/* If Obj is written in the global memory, Obj becomes accessible from outside of this method, thereby it is determined that Obj has escaped */

Fig. 7

| | The set of objects which have not escaped | |
|---|---|---|
| Obj = NEW xx; | | |
| Obj.x = a; | { Obj } | |
| foo (D, E) | { Obj } | /* The object Obj may never be accessed from inside of foo here, so it is not necessary to kill this method call for the memory access with respect to Obj in Scalar replacement */ |
| | | /* It is optimized and loading from the memory is eliminated */ |
| b = a; | | /* Obj has escaped */ |
| D.obj = Obj; | { Obj } | /* Obj.x may be changed in foo */ |
| foo (D, E) | | /* → It may not be optimized because this Obj.x may have been changed in foo */ |
| c = Obj.x; | | |

EXECUTING SCALAR REPLACEMENT IN PROGRAM OPTIMIZATION

FIELD OF THE INVENTION

The present invention relates to a method for improving execution efficiency of a program by means of scalar replacement in the program.

BACKGROUND ART

There is an approach called scalar replacement for optimizing the program in which variables on a global memory are replaced into local locations in a method (such as local variables). This optimization is known to have not only an effect to "reduce a cost for a memory access", but also a secondary effect to significantly increase an effect of a subsequent optimization (such as elimination of a common subexpression), because of the extended area where the replaced variables can reside.

If the scalar replacement is executed, there is an inconvenience in a method invocation residing in the program. That is, since a value of the variable on the global memory may be changed within the invoked method, it has not been able to simply optimize beyond the method invocation.

Conventionally, there is a method for optimizing the memory access beyond the method invocation, in which a technique called Escape Analysis is used to analyze in the invoked method, and the optimization is executed based on the result of the analysis. In this method, for an object created by new, newarray or the like in the method, the optimization is executed by taking the memory of the object not in a heap area but in a stack area, only in the case where the object may not be referred to from outside of the method, in all location within the method (which is referred to as "the object does not escape"). Note that the Escape Analysis is described in detail, for example, in the following documents 1 and 2:

Document 1: Escape Analysis for Java® (In Proceedings of the 1999 ACM SIGPLAN Conference on Object-Oriented Programming, Systems, Languages, and Applications (hereinafter referred to as OOPSLA) '99); and Document 2: Compositional Pointer and Escape Analysis for Java® Programs (OOPSLA '99).

However, as described above, optimization using Escape Analysis is not able to perform optimization for the method in the case where there is even only a single part escaping in the method.

In addition, since analysis in an invocation method with the Escape Analysis requires a significant process cost, it may be difficult to induce. For example, when the analysis is applied to a compiler such as a JIT (Just In Time) compiler in Java®, which is affected in its compilation time, there is a very severe limit in the consideration of method size and the like.

Furthermore, the analysis in the invocation method itself may not be executed at all because of, for example, a dynamic call command.

SUMMARY OF THE INVENTION

Therefore, it is an aspect of the present invention to enable to execute scalar replacement in the program optimization, more effectively without executing the analysis in the invocation method.

BRIEF DESCRIPTION OF THE DRAWINGS

These and other objects, features, and advantages of the present invention will become apparent upon further consideration of the following detailed description of the invention when read in conjunction with the drawing figures, in which.

DESCRIPTION OF SYMBOLS

100 . . . Compiler
110 . . . Code conversion unit
120 . . . Optimized range determination unit
130 . . . Scalar replacement execution unit
220 . . . Program execution unit
300 . . . Code input unit

DESCRIPTION OF THE INVENTION

In order to achieve the above described aspect, the present invention is realized as a program conversion method as will be described below, for using a computer, reading a source code of an execution program written in an object-oriented programming language and converting it into a machine language code. That is, the program conversion method is characterized in that the method comprises the steps of: for a method in the execution program to be processed, finding a range in which an object created in the method does not escape; executing scalar replacement in the range in which the object does not escape; and storing the execution program on which the scalar replacement is executed, in the memory.

The step of executing the scalar replacement preferably executes the scalar replacement for a method invocation in the range in which the object does not escape, regarding that a memory access with respect to the object is not changed.

In addition, the step of finding the range in which the object does not escape comprises, in detail, the steps of: in the execution program, finding a set of objects which are created in the method and do not escape, for each basic block with forward data flow analysis; and examining commands in the basic block sequentially from beginning, and finding a set of objects which are created in the method and do not escape, in a location of each of the commands.

In addition, another program conversion method according to the present invention is characterized in that the method comprises the steps of: generating a machine language code based on a source code of an execution program to be processed; for a method in the execution program of the generated machine language code, executing scalar replacement beyond a method invocation in a range in which an object created in the method is not referred to from outside.

The step of executing the scalar replacement comprises, in detail, the step of determining the range in which the object is not referred to from outside by finding a set of objects which are created in the method and not written in a global memory, for each basic block of the execution program.

In addition, another one of the present invention for achieving the above object is realized as a computer configured as will be described below, for reading a source code of an execution program written in an object-oriented programming language and converting it into a machine language code. That is, the computer is characterized in that the device comprises: a code conversion unit for generating the machine language code based on the source code of the execution program to be processed; an optimized range determination unit for, for a method in the execution program of the machine language, finding a range in which an object created in the method does not escape; and a scalar replacement execution unit for executing scalar replacement in the range in which the object does not escape.

The scalar replacement execution unit preferably executes the scalar replacement for a method invocation in the range in which the object does not escape, regarding that a memory access with respect to the object is not changed.

Furthermore, the optimized range determination unit comprises, in more detail, first means for, in the execution program, finding a set of objects which are created in the method and do not escape, for each basic block with forward data flow analysis; and second means for examining commands in the basic block sequentially from beginning, and finding a set of objects which are created in the method and do not escape, in a location of each of the commands.

In addition, another computer according to the present invention is characterized in that the device comprises: a code conversion unit for generating the machine language code based on the source code of the execution program; and an optimization unit for, in the execution program of the machine language code generated by the code conversion unit, for a method in the execution program, executing scalar replacement beyond a method invocation in a range in which an object created in the method does not escape.

The above described computer may further comprise a program execution unit for executing the execution program converted into the machine language code.

Furthermore, the present invention may be realized as a program for realizing the above described program conversion method or various functions by controlling a computer. This program may be provided by storing and distribute it in a magnetic disk, an optical disk, a semiconductor memory, or other storage media, or delivering it via a network.

The present invention will be described below in detail based on example embodiments shown in the accompanying drawings.

Figure 1:
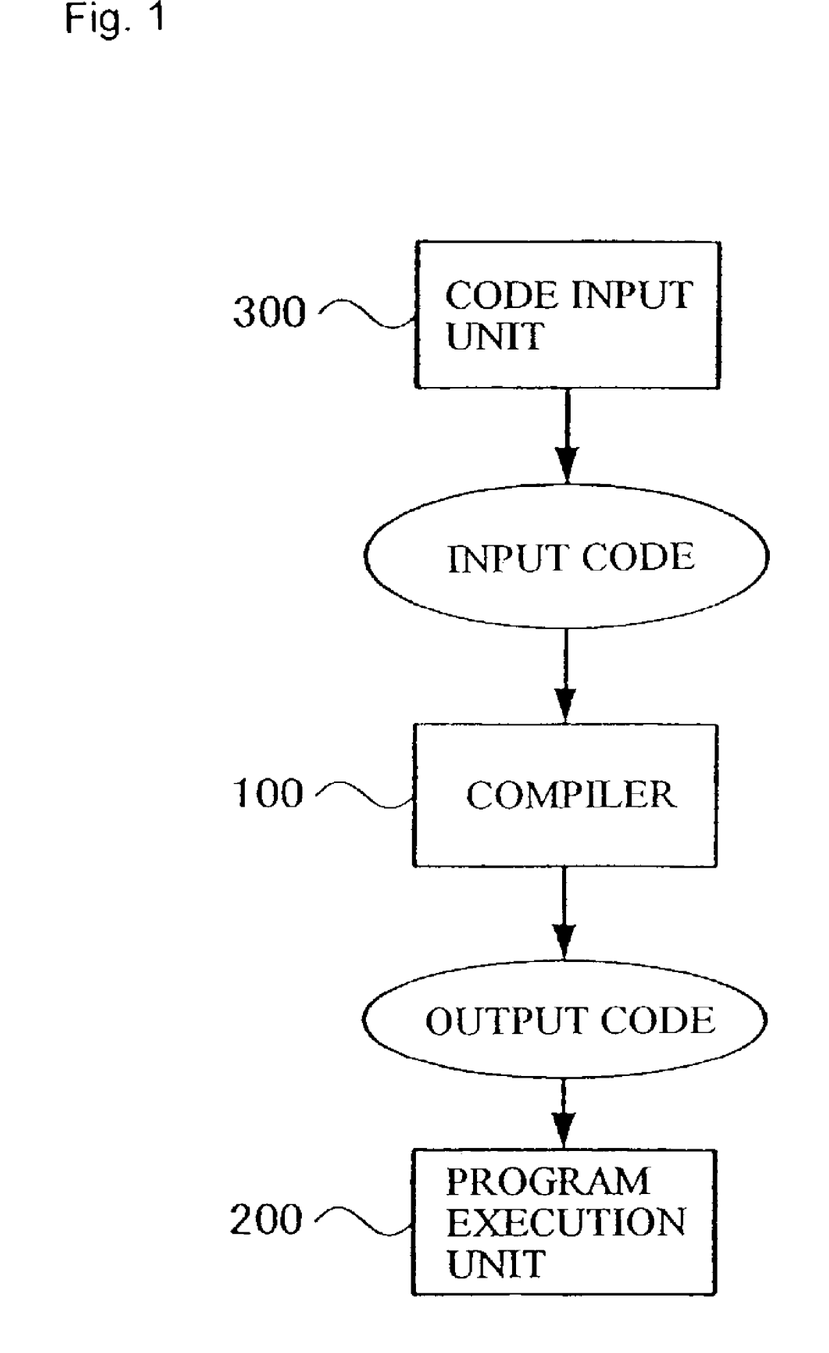
FIG. 1 shows an example of a system configuration of a computer system for realizing an optimization method according to the present embodiment.

FIG. 1 shows an example of a system configuration of a computer system for realizing an optimization method according to the present embodiment.

Referring to FIG. 1, the computer system according to the present embodiment is provided with a compiler 100 for compiling a source program (an input code or a source code) and a program execution unit 200 for executing an object program (an output code or an object code) compiled in the compiler 100 to perform various processes. The compiler 100 and the program execution unit 200 are realized in a CPU and a memory such as a RAM and the like, programmably controlled in a computer such as a personal computer, a workstation and the like. In the memory not shown, a program for controlling the CPU to operate it as the compiler 100 or the program execution unit 200, or a program to be compiled is stored. It should be noted that the program to be stored in the memory is properly saved and stored in a magnetic disk or other storage media as necessary.

In FIG. 1, the compiler 100 inputs a source code of a program (the program to be compiled, which is hereinafter referred to as an execution program) written in a predetermined program language or a byte code from a code input unit 300 and processes it, then generates and outputs the object code written in a machine language. The code input unit 300 is realized in a code generation device for generating the source code or a storage device (such as a magnetic disk unit) having stored the source code generated in the code generation device. In addition, the code input unit 300 may be realized in a network interface for inputting the source code from the code generation device or the storage device residing on a network, via the network. The object code of the execution program generated by the compiler 100 is executed by the program execution unit 200.

It should be noted that, in the present embodiment, the compiler 100 may be a compiler such as a JIT (Just In Time) compiler in Java®, for dynamically executing compilation process when the program execution unit 200 executes the execution program, and the compiler 100 also may be a compiler to be used in the case where the object program generated by previously compiling a source program is used as the execution program. In addition, the compiler 100 and the program execution unit 200 may be provided in a single computer, or the compiler 100 and the program execution unit 200 may be realized in several computers.

Figure 2:
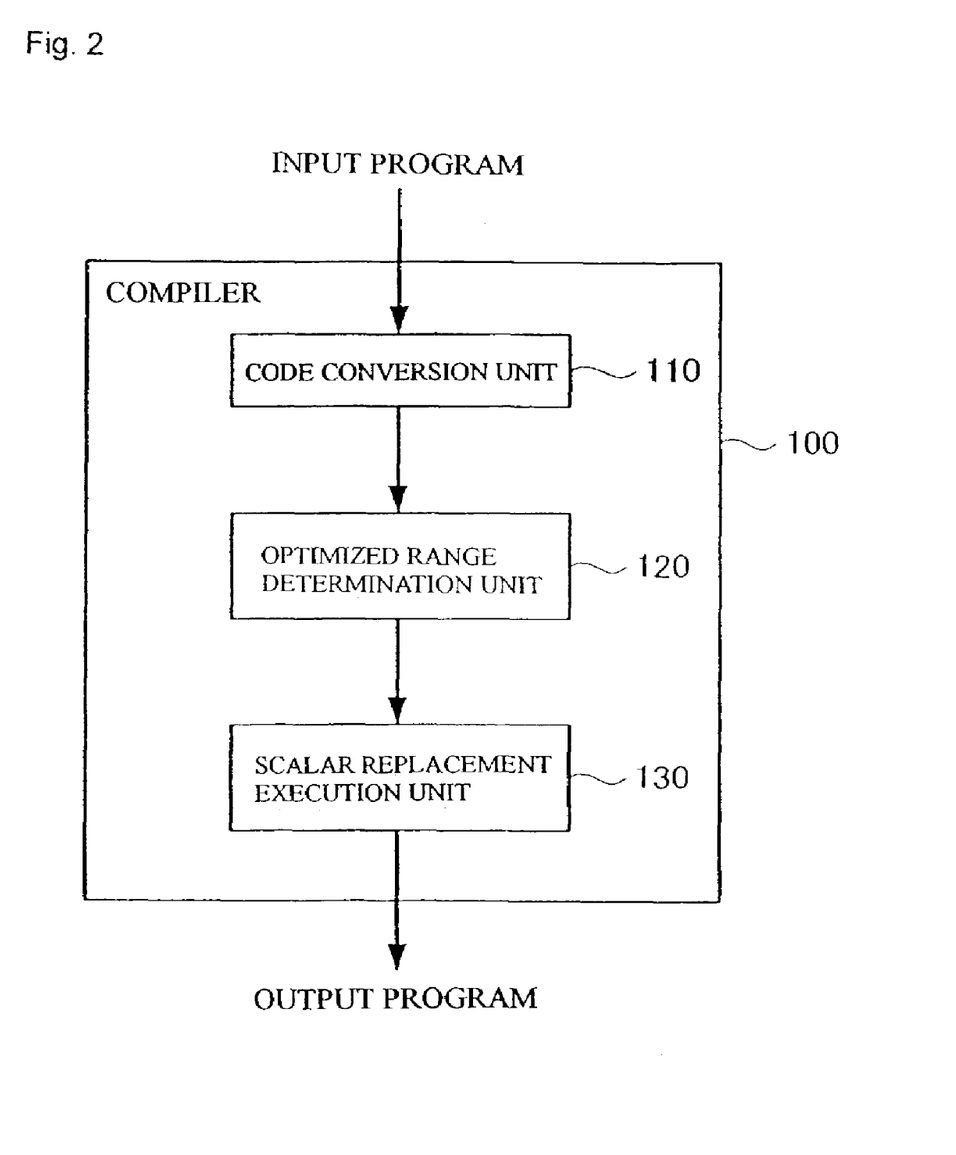
FIG. 2 illustrates a configuration of a compiler according to a present embodiment.

FIG. 2 illustrates a configuration of the compiler 100 in the present embodiment. The compiler 100 according to the present embodiment executes optimization with respect to the compiled program code with the following approach:

The compiler 100 finds a range R(Obj) for an object Obj created by new, newarray or the like in a method, in which the object does not escape (that is, the object Obj may not be referred to from outside of the method).

The compiler 100 executes scalar replacement for a method invocation in the range R(Obj), regarding that a memory access with respect to the object Obj is not changed.

Referring to FIG. 2, the compiler 100 is provided with a code conversion unit 110 for converting the source code into the object code, an optimized range determination unit 120 for, with respect to the object code generated in the code conversion unit 110, determining the above described range R(Obj), and a scalar replacement execution unit 130 for executing the scalar replacement for the method invocation in the range R(Obj) determined in the optimized range determination unit 120. The optimized range determination unit 120 and the scalar replacement execution unit 130 function as an optimization unit for executing the above described optimization.

Each of components of the compiler 100 as shown in FIG. 2 is a virtual software block to be realized in the CPU programmably controlled. Note that the components of the compiler 100 as shown in FIG. 2 are related to characteristic functions in the present embodiment. It should be noted that, practically, the compiler 100 further has common functions in the compilation process such as lexical analysis or parsing of the source code required for the code conversion, and various optimization processes other than the optimization according to the present embodiment, although they are not shown.

The compiler 100 configured as described above inputs the execution program to be processed and holds it in the memory. Then, after reading the execution program out of the memory to execute the lexical analysis or the parsing, based on information obtained by these analyses, the compiler 100 generates the object code with the code conversion unit 110. The generated object code is stored in the memory. The optimized range determination unit 120 of the compiler 100 reads the object code generated in the code conversion unit 110 out of the memory, and finds the range R(Obj) with respect to the object code, as described above.

In a detailed operation, first, the optimized range determination unit 120 uses forward data flow analysis denoted in the following formula 1 to find a set of objects In(n) to be determined as "objects which are created by new, newarray and the like in the method and have not escaped yet" at beginning of a basic block n. Then based on the found set In(n), the optimized range determination unit 120 examines commands in the basic block n sequentially from beginning, finds a set of "the objects which are created by new, newarray and the like in the method and have not escaped yet" in a location of each of the commands, and sets a range of the objects included in this set as the range R(Obj).

$$In(n) = \bigcap_{m \in Pred} Out(m)$$  [Formula 1]

$$Out(m) = (In(n) - Kill(n)) \cup Gen(n)$$

Where Gen(n) is a set of the objects which are created by new, newarray and the like in the basic block n and have not escaped yet at a last point in the basic block n. Kill(n) is a set of the objects which escape in the basic block n. In addition, the basic block is a range of a straight code, that is, code columns in which any control flow does not enter therein nor go out in the middle thereof, which is recognized as a block.

Figure 3:
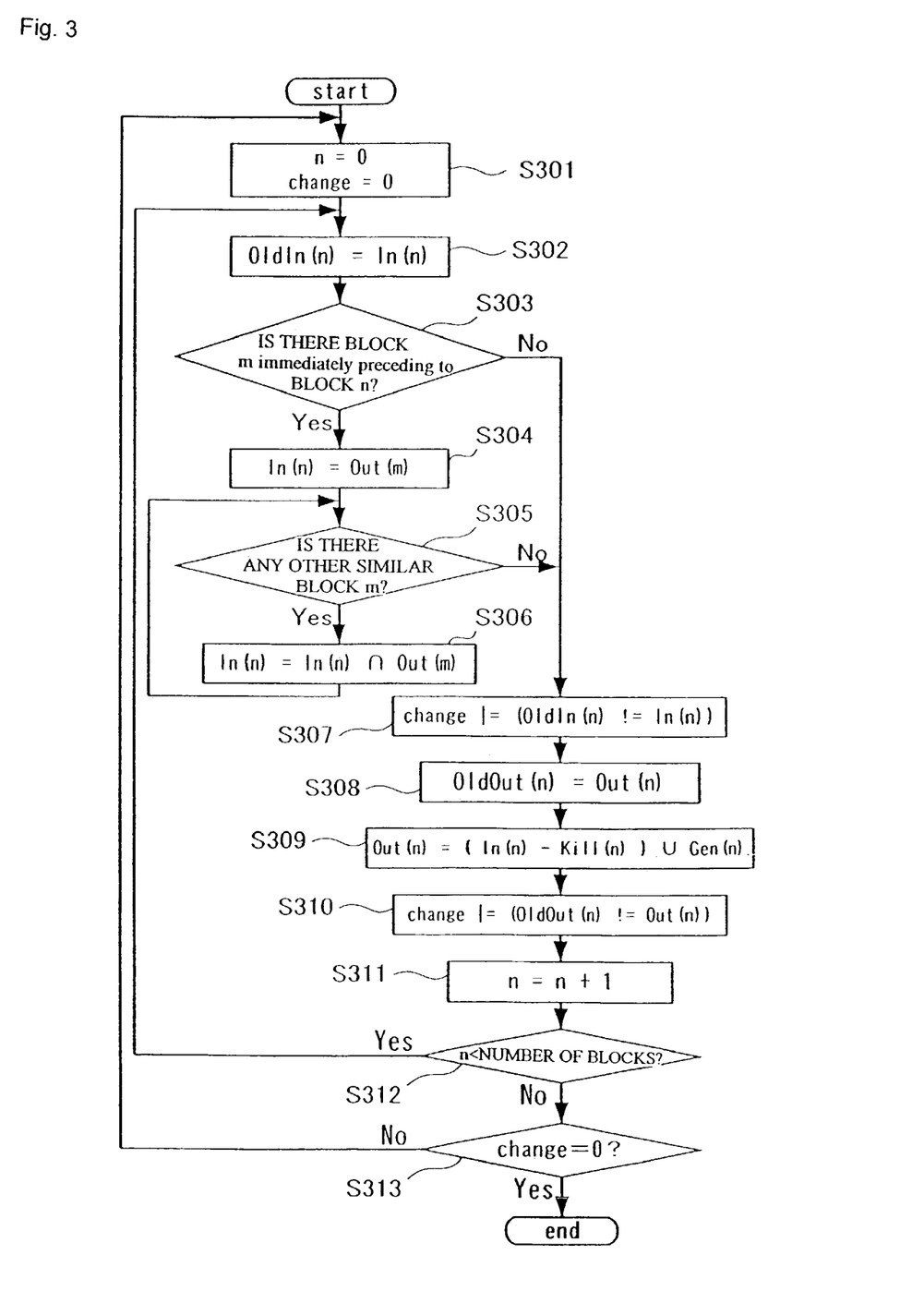
FIG. 3 shows an example of a flowchart illustrating the detail of a process for finding a set of objects In(n) by a optimized range determination unit of the present embodiment.

FIG. 3 is a flowchart illustrating the detail of a process for finding the set of the objects In(n) executed with the forward data flow analysis in the optimized range determination unit 120.

As shown in FIG. 3, the optimized range determination unit 120 first initializes parameters n and change (step 301). n means a basic block number and change means a flag of convergence test in solving a data flow equation.

Next, the optimized range determination unit 120 makes a copy of the set of the objects In as a set OldIn in order to compare with the set In later (step 302). Then, it is examined whether there are the basic block n (denoted as BLOCK n in FIG. 3) and an immediately preceding basic block (denoted as BLOCK m in FIG. 3) (step 303). If there is the basic block (BLOCK m), contents of the set In(n) are set to be In(n)=Out(m) (step 304). Then, it is examined whether there is any other basic block (BLOCK m) immediately preceding to the basic block n (step 305). If there is the basic block (BLOCK m), the contents of the set In(n) is set to be In(n)=In(n) ∩ Out(m) (step 306). The process from step 303 to step 306 is practically calculating a first expression of the formula 1 (for calculating the set In from the set Out).

In step 303 or step 305, if there is not the basic block (BLOCK m) immediately preceding to the basic block n, next the optimized range determination unit 120 compares the set OldIn generated in step 302 with the set In. If the contents of both sets are different from one another, the flag of change is set on (step 307).

Next, the optimized range determination unit 120 makes a copy of the set Out as a set OldOut in order to compare with the set Out later (step 308). Then, the contents of the set Out(n) are set to be Out(n)=(In(n)−Kill(n)) ∪ Gen(n) (step 309). The process of step 309 is practically calculating a second expression of the formula 1 (for calculating Out from In).

Next, the optimized range determination unit 120 compares the set OldOut generated in step 308 with the set Out. If the contents of both sets are different from one another, the flag of change is set on (step 310). After the above described process, the optimized range determination unit 120 adds 1 to the parameter n (step 311), and examines whether a new value of n has reached the number of the basic blocks. The process from step 302 to step 310 is repeated until the value of n reaches the number of the basic blocks (that is, the process is completed for all the basic blocks) (step 312).

If the process is completed for all the basic blocks, the optimized range determination unit 120 next examines whether there is any set having the flag of change set on, and repeats the process from step 301 to step 312 until all the flags of change is not set on (that is, until it becomes convergence) (step 313).

As described above, the optimized range determination unit 120, then based on the set In(n) found as described above, examines the commands in the basic block n sequentially from beginning and determines the range R(Obj).

The scalar replacement execution unit 130 of the compiler 100 executes the scalar replacement for the method invocation in the range R(Obj) determined in the optimized range determination unit 120, regarding that the memory access with respect to the object Obj is not changed (that is, beyond the method invocation).

Then in the process of a method invocation command on which the scalar replacement is executed, a part for executing the process of "because the value of the memory may be changed in the method invocation, the optimization may not be executed beyond this method invocation" is altered to the process depending on the following two cases:

if this part is a set, which is found in a location of this command, of the objects which are created by new, newarray or the like in the method and have not escaped yet, the value of the memory in the object may never be changed in this method invocation, therefore the optimization may be executed beyond this method invocation; and if this part is not a set, which is found in a location of this command, of the objects which are created by new, newarray or the like in the method and have not escaped yet, the value of the memory in the object may be changed in this method invocation, therefore the optimization may not be executed beyond this method invocation.

Figure 4:
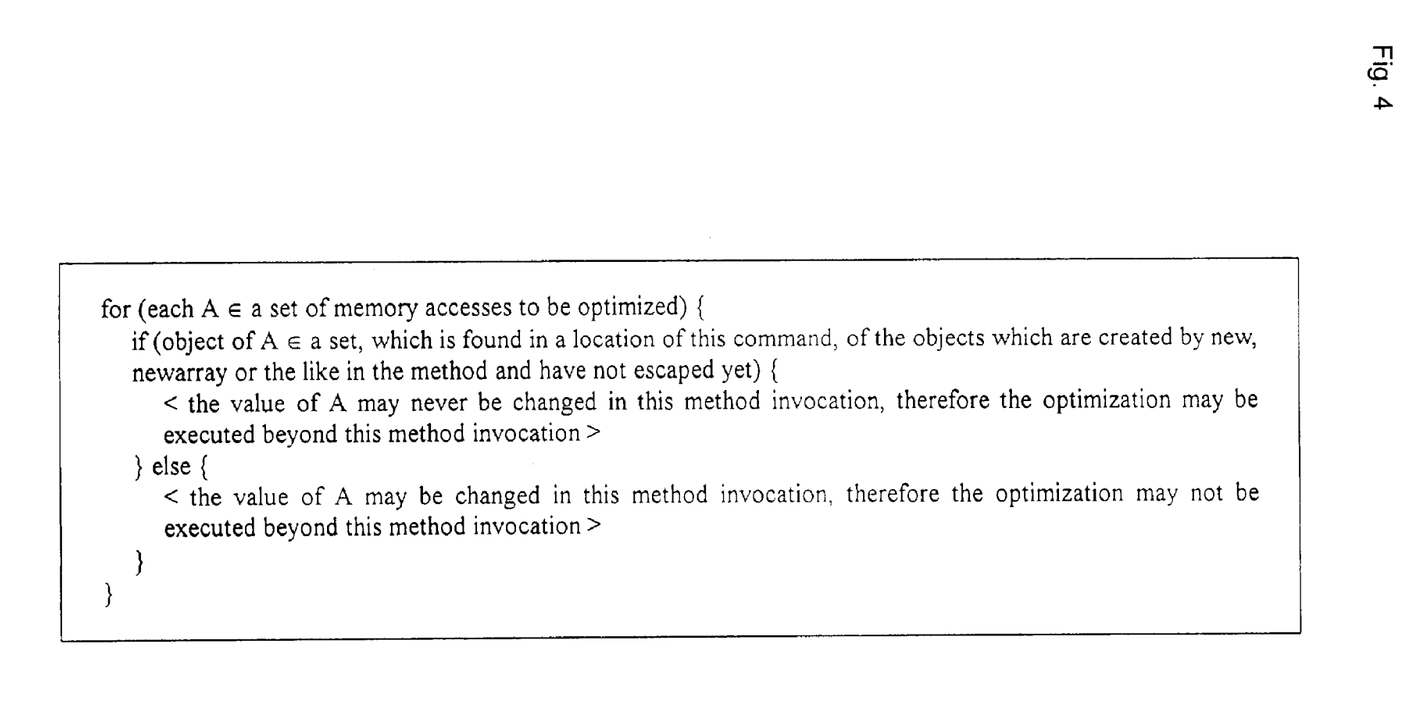
FIG. 4 shows an example of an algorithm of alteration of the process after scalar replacement of the present embodiment is executed.

FIG. 4 shows an example of an algorithm of alteration of the process. The execution program, in which the optimization with the scalar replacement is executed as described above, is stored in the memory after the other optimization is further executed thereon as necessary, and is read out to execute by the program execution unit 200.

Next, an example of executing the optimization in the case where the present embodiment is applied to a real program will be described.

Figure 5:
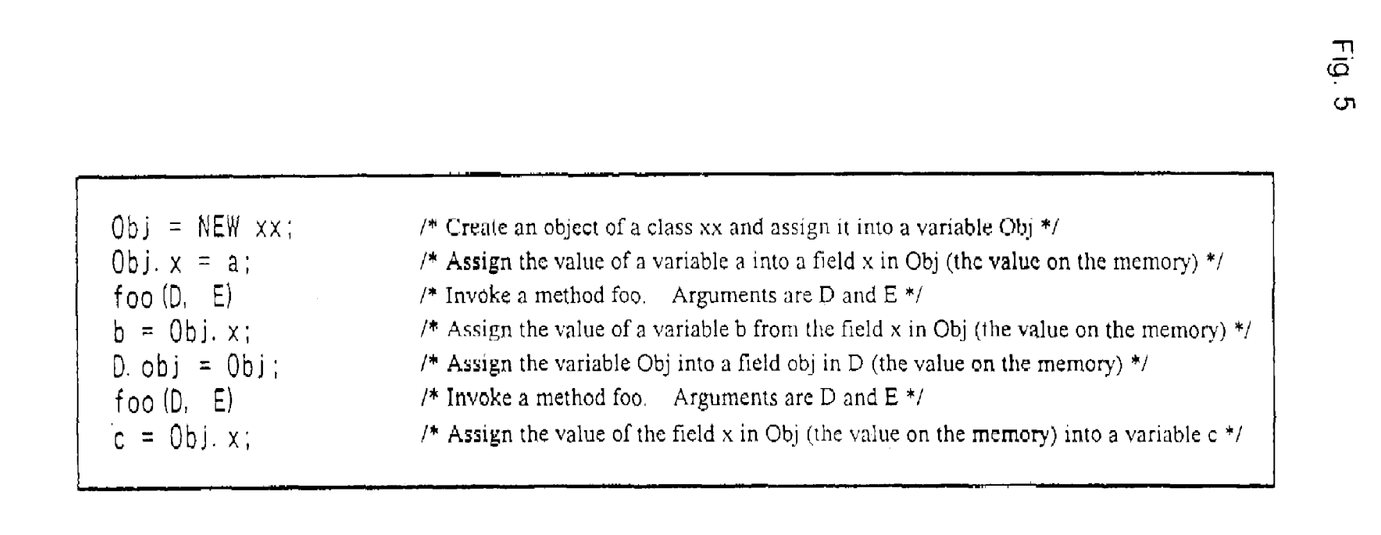
FIG. 5 illustrates a program to which the present embodiment is applied.

FIG. 5 illustrates a program to which the present embodiment is applied. In the program shown in FIG. 5, with conventional Escape Analysis, since there is a method invocation foo(D, E), the analysis is executed in the method invocation foo(D, E) and the access to Obj.x may not be optimized unless it ensures that the value of Obj.x is not changed. This analysis requires a significant process cost and such analysis may not be executed in some method invocations, thereby the optimization may not be executed with the scalar replacement.

In the present embodiment, for the program of FIG. 5, first the optimized range determination unit 120 determines the range R(Obj).

Figure 6:
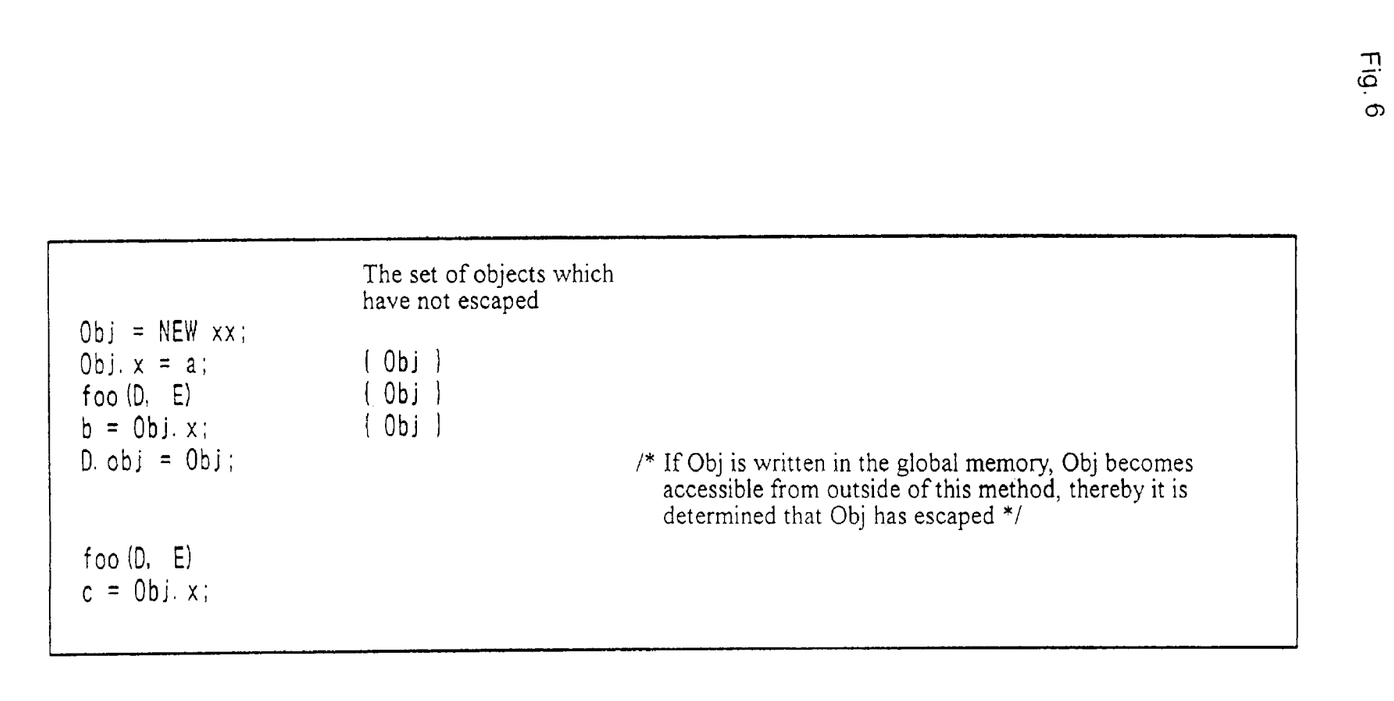
FIG. 6 shows an example of a condition in which a range R(Obj) is determined for the program of FIG. 5.

FIG. 6 shows an example of a condition in which the range R(Obj) is determined for the program of FIG. 5. In FIG. 6, for three lines of Obj.x=a, foo(D, E) and b=Obj.x; in lines 2 to 4, Obj defined with new (denoted as NEW in FIG. 6) does not escape. Then, in D.obj=Obj in the next line, Obj is written in the global memory so that Obj becomes accessible from outside of the method, thereby it is determined that Obj has escaped. Then, the above three lines becomes the range R(Obj). Next, the scalar replacement execution unit 130 executes the scalar replacement for the range R(Obj).

Figure 7:
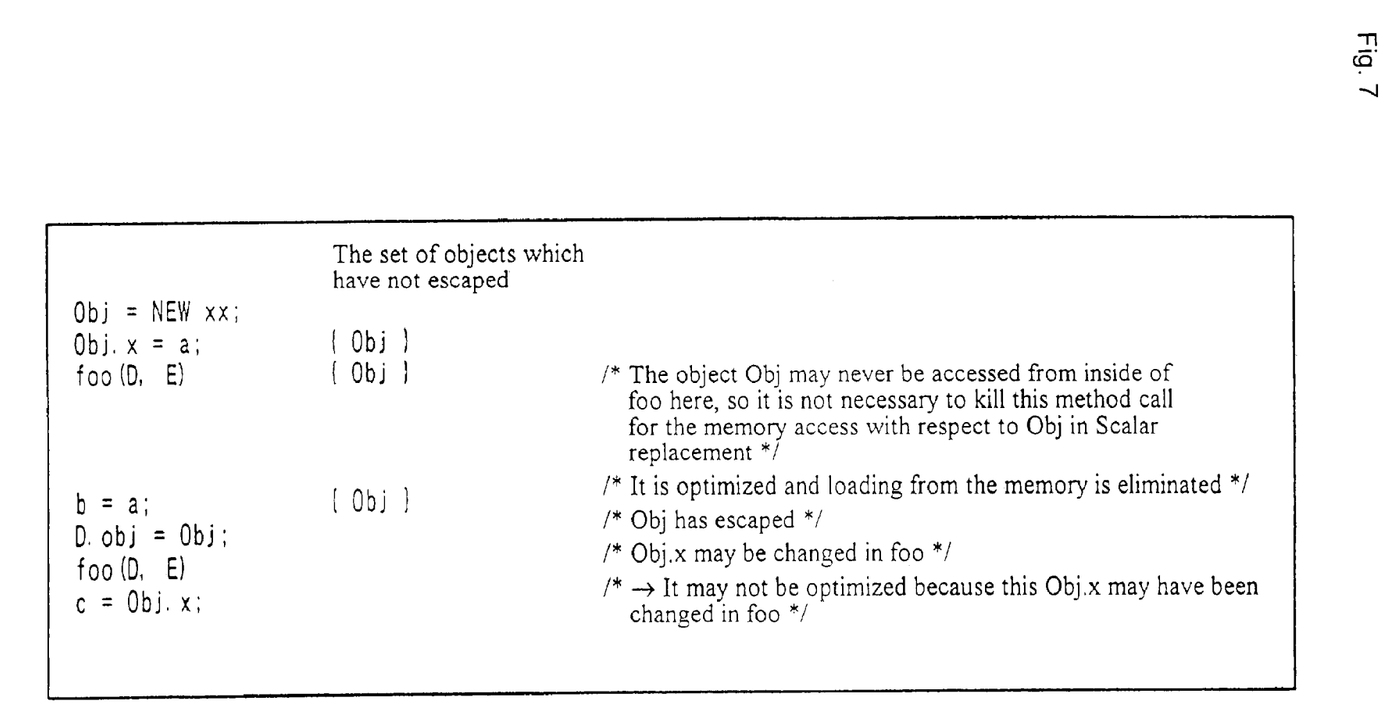
FIG. 7 shows an example of a condition in which the scalar replacement is executed for the range R(Obj) as shown in FIG. 6.

FIG. 7 shows an example of a condition in which the scalar replacement is executed for the range R(Obj) as shown in FIG. 6. In FIG. 7, as to foo(D, E) in the line 3, this part is created by new in the method and is included in the set of the objects which have not escaped yet, thereby it may be understood that the object Obj may never be accessed from inside of foo here. Therefore, for the memory access with respect to Obj, it is not necessary to kill this method call. In addition, the line 4 is replaced with b=a (see the line 2) by the scalar replacement, and loading from the memory is eliminated (that is, it is optimized).

On the other hand, foo(D, E) in the line 6 is the method invocation after Obj has escaped with D.obj=Obj in the line 5, thereby the value of the variable may be changed in the invoked method foo(D, E). Therefore, c=Obj.x; in the next line may not be optimized as in the line 4.

As described above, according to the present embodiment, even if there is any method invocation with respect to the other method in the method, it is possible to execute the optimization with the scalar replacement for the object defined in the method, in the range in which the object does not escape.

In addition, if the method includes a dynamic call command, it is possible to execute the optimization with the scalar replacement by utilizing the above mentioned approach as it is, for the object defined in the method, in the range in which the object does not escape.

Furthermore, the analysis with the Escape Analysis is not required, thereby the process cost required for the analysis process is reduced so that the present embodiment is preferable to a dynamic compiler such as the JIT compiler in Java®.

As described above, according to the present invention, it is possible to execute the scalar replacement in the program optimization, more effectively without executing the analysis in the method.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein —is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A program conversion method comprising the steps of:
using a computer, reading a source code of an execution program written in an object-oriented programming language and converting it into a machine language code, without executing an analysis in an invocation method;
reading said execution program to be processed from a memory, and for a method in said execution program, finding a range in which an object in said execution program created in said method does not escape by:
  finding a set of objects which are created in said method and do not escape, for each basic block with forward data flow analysis, and
  examining commands in said basic block sequentially from beginning, and finding a set of objects which are created in said method and do not escape, in a location of each of the commands;

executing scalar replacement in the range in which said object does not escape by:
  determining the range in which said object is not referred to from outside by finding a set of objects which are created in said method and not written in a global memory, for each basic block of said execution program; and
storing the execution program on which said scalar replacement is executed, in the memory.

2. The program conversion method according to claim 1, wherein the step of executing said scalar replacement comprises a step of executing the scalar replacement for a method invocation in the range in which said object does not escape, regarding that a memory access with respect to said object is not changed.

3. The program conversion method according to claim 1, wherein the step of storing comprises the steps of:
  storing the execution program in a magnetic disk, an optical disk, a semiconductor memory, or other storage media, or delivering it via a network.

4. A program conversion method comprising:
  using a computer and reading a source code of an execution program written in an object-oriented programming language and converting it into a machine language code, without executing an analysis in an invocation method;
  reading said execution program to be processed from a memory, generating said machine language code based on the source code of said execution program and storing the execution program of the generated machine language code in the memory;
  reading the execution program of said machine language code from said memory, and for a method in said execution program, executing scalar replacement beyond a method invocation in a range in which an object created in said method is not referred to from outside, wherein the step of executing said scalar replacement comprises a step of determining the range in which said object is not referred to from outside by finding a set of objects which are created in said method and not written in a global memory, for each basic block of said execution program; and
  storing the execution program on which said scalar replacement is executed, in the memory.

5. The program conversion method according to claim 4, wherein the step of storing comprises a step of:
  storing the execution program in a magnetic disk, an optical disk, a semiconductor memory, or other storage media, or delivering it via a network.

6. A computer for reading a source code of an execution program written in an object-oriented programming language and converting it into a machine language code, without executing an analysis in an invocation method; wherein comprising:
  a code conversion unit for generating said machine language code based on the source code of said execution program to be processed;
  an optimized range determination unit for, for a method in said execution program, finding a range in which an object created in said method does not escape by:
    finding a set of objects which are created in said method and do not escape, for each basic block with forward data flow analysis, and
    examining commands in said basic block sequentially from beginning, and finding a set of objects which are created in said method and do not escape, in a location of each of the commands; and
  a scalar replacement execution unit for executing scalar replacement in the range in which said object does not escape, found in said optimized range determination unit, wherein executing said scalar replacement comprises determining the range in which said object is not referred to from outside by finding a set of objects which are created in said method and not written in a global memory, for each basic block of said execution program.

7. The computer according to claim 6, wherein said scalar replacement execution unit executes the scalar replacement for a method invocation in the range in which said object does not escape, regarding that a memory access with respect to said object is not changed.

8. The computer according to claim 6, wherein said optimized range determination unit comprises:
  first means for, in said execution program, finding a set of objects which are created in said method and do not escape, for each basic block with forward data flow analysis; and
  second means for examining commands in said basic block sequentially from beginning, and finding a set of objects which are created in said method and do not escape, in a location of each of the commands.

9. A computer for reading a source code of an execution program written in an object-oriented programming language and converting it into a machine language code, comprising:
  a code conversion unit for generating said machine language code based on the source code of said execution program, without executing an analysis in an invocation method; and
  an optimization unit for, in the execution program of said machine language code generated by said code conversion unit, for a method in said execution program, executing scalar replacement beyond a method invocation in a range in which an object created in said method does not escape, wherein executing said scalar replacement comprises determining the range in which said object is not referred to from outside by finding a set of objects which are created in said method and not written in a global memory, for each basic block of said execution program.

10. A computer comprising:
  a compiler for compiling a source code of a program written in an object-oriented programming language to convert it into a machine language code, without executing an analysis in an invocation method; and
  a program execution unit for executing said program converted into the machine language code,
  wherein the compiler comprises:
  a code conversion unit for generating said machine language code based on the source code of said execution program;
  an optimized range determination unit for reading said execution program to be processed from a memory, and for a method in said execution program, finding a range in which an object created in said method does not escape by finding a set of objects which are created in said method and do not escape, for each basic block with forward data flow analysis, and examining commands in said basic block sequentially from beginning, and finding a set of objects which are created in said method and do not escape, in a location of each of the commands; and
  a scalar replacement execution unit for executing scalar replacement beyond a method invocation in said range, in the range in which said object does not escape, found in said optimized range determination unit, wherein executing said scalar replacement comprises determining the range in which said object is not referred to from outside by finding a set of objects which are created in said method and not written in a global memory, for each basic block of said execution program.

11. A program being stored on a tangible computer readable medium, for controlling a computer and converting a source code of an execution program written in an object-oriented programming language into a machine language code, without executing an analysis in an invocation method, the program causing said computer to execute the processes of:

reading the execution program to be processed from a memory, and for a method in said execution program, finding a range in which an object created in said method does not escape by finding a set of objects which are created in said method and do not escape, for each basic block with forward data flow analysis, and examining commands in said basic block sequentially from beginning, and finding a set of objects which are created in said method and do not escape, in a location of each of the commands;

executing scalar replacement in the range in which said object does not escape, wherein the step of executing said scalar replacement comprises a step of determining the range in which said object is not referred to from outside by finding a set of objects which are created in said method and not written in a global memory, for each basic block of said execution program; and storing the execution program on which said scalar replacement is executed, in the memory.

12. The program according to claim 11, wherein the program causes said computer to execute the scalar replacement for a method invocation in the range in which said object does not escape, regarding that a memory access with respect to said object is not changed, in the process of executing said scalar replacement.

13. The program according to claim 11, wherein the process of storing comprises the processes of:

storing the execution program in a magnetic disk, an optical disk, a semiconductor memory, or other storage media, or delivering it via a network.

14. A program being stored on a tangible computer readable medium, for controlling a computer and converting a source code of an execution program written in an object-oriented programming language into a machine language code, without executing an analysis in an invocation method; the program causing said computer to execute the processes of:

reading the execution program to be processed from a memory, generating said machine language code based on the source code of said execution program and storing the execution program of the generated machine language code in the memory;

reading the execution program of said machine language code from said memory, and for a method in said execution program, executing scalar replacement beyond a method invocation in a range in which an object created in said method is not referred to from outside, wherein the step of executing said scalar replacement comprises a step of determining the range in which said object is not referred to from outside by finding a set of objects which are created in said method and not written in a global memory, for each basic block of said execution program; and storing the execution program on which said scalar replacement is executed, in the memory.

15. The program according to claim 14, wherein the process of storing comprises the process of:

storing the execution program in a magnetic disk, an optical disk, a semiconductor memory, or other storage media, or delivering it via a network.

16. A storage medium for recording a program to be readable by a computer, said program being for controlling said computer and converting a source code of an execution program written in an object-oriented programming language into a machine language code, without executing an analysis in an invocation method, the program causing said computer to execute the processes of:

reading said execution program to be processed from a memory, and for a method in said execution program, finding a range in which an object created in said method does not escape by finding a set of objects which are created in said method and do not escape, for each basic block with forward data flow analysis, and examining commands in said basic block sequentially from beginning, and finding a set of objects which are created in said method and do not escape, in a location of each of the commands;

executing scalar replacement in the range in which said object does not escape, wherein the step of executing said scalar replacement comprises a step of determining the range in which said object is not referred to from outside by finding a set of objects which are created in said method and not written in a global memory, for each basic block of said execution program; and storing the execution program on which said scalar replacement is executed, in the memory.

17. A storage medium for recording a program to be readable by a computer, said program being for controlling said computer and converting a source code of an execution program written in an object-oriented programming language into a machine language code, without executing an analysis in an invocation method, the program causing said computer to execute the processes of:

reading said execution program to be processed from a memory, generating said machine language code based on the source code of said execution program and storing the execution program of the generated machine language code in the memory;

reading the execution program of said machine language code from said memory, and for a method in said execution program, executing scalar replacement beyond a method invocation in a range in which an object created in said method is not referred to from outside, by determining the range in which said object is not referred to from outside by finding a set of objects which are created in said method and not written in a global memory, for each basic block of said execution program; and storing the execution program on which said scalar replacement is executed, in the memory.

18. A program conversion apparatus comprising:
means for using a computer,
means for reading a source code of an execution program written in an object-oriented programming language and converting it into a machine language code, the means for reading a source code comprising:
means for reading said execution program to be processed from a memory, and for a method in said execution program, finding a range in which an object created in said method does not escape;

means for executing scalar replacement in the range in which said object does not escape wherein executing said scalar replacement comprises determining the range in which said object is not referred to from outside by finding a set of objects which are created in said method and not written in a global memory, for each basic block of said execution program; and means for storing the execution program on which said scalar replacement is executed, in the memory.

19. An article of manufacture comprising a computer usable medium having computer readable program code means embodied therein for causing program conversion, the computer readable program code means in said article of manufacture comprising computer readable program code means for causing a computer to effect the steps of claim 1.

20. An article of manufacture comprising a computer usable medium having computer readable program code means embodied therein for causing program conversion, the computer readable program code means in said article of manufacture comprising computer readable program code means for causing a computer to effect the steps of claim 4.

21. A program storage device readable by machine, tangibly embodying a program of instructions executable by the machine to perform method steps for program conversion, said method steps comprising the steps of claim 1.

22. A program storage device readable by machine, tangibly embodying a program of instructions executable by the machine to perform method steps for program conversion, said method steps comprising the steps of claim 4.

* * * * *